US012776694B2

(12) United States Patent
Qian et al.

(10) Patent No.: US 12,776,694 B2
(45) Date of Patent: Oct. 27, 2026

(54) SWITCHING CONVERTER WITH FLOATING NODE AND ASSOCIATED CONTROL CIRCUIT

(71) Applicant: Chengdu Monolithic Power Systems Co., Ltd., Chengdu (CN)

(72) Inventors: Junlin Qian, Chengdu (CN); Yuedong Chen, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 41 days.

(21) Appl. No.: 18/953,063

(22) Filed: Nov. 20, 2024

(65) Prior Publication Data

US 2025/0167687 A1 May 22, 2025

(30) Foreign Application Priority Data

Nov. 22, 2023 (CN) ......................... 202311567561.5

(51) Int. Cl.
*H02M 1/00* (2007.01)
*H02M 1/08* (2006.01)
*H02M 3/335* (2006.01)

(52) U.S. Cl.
CPC ....... *H02M 1/0006* (2021.05); *H02M 1/0009* (2021.05); *H02M 1/08* (2013.01); *H02M 3/33507* (2013.01); *H02M 3/33569* (2013.01)

(58) Field of Classification Search
CPC .... H02M 1/0006; H02M 1/0009; H02M 1/08; H02M 3/33507; H02M 3/33569
See application file for complete search history.

(56) References Cited

U.S. PATENT DOCUMENTS

| | | | | |
|---|---|---|---|---|
| 11,705,803 | B1 | 7/2023 | Han et al. | |
| 2009/0164196 | A1* | 6/2009 | Saitou | G06F 30/367 703/14 |
| 2011/0187416 | A1 | 8/2011 | Bakker | |
| 2013/0076322 | A1* | 3/2013 | Tateno | H02M 3/158 323/271 |
| 2020/0350825 | A1* | 11/2020 | Tzeng | H02M 3/33569 |
| 2021/0175817 | A1 | 6/2021 | Miao et al. | |
| 2022/0006450 | A1* | 1/2022 | Fontana | H02M 1/08 |
| 2022/0329240 | A1 | 10/2022 | Jiang et al. | |

* cited by examiner

*Primary Examiner* — Jue Zhang
(74) *Attorney, Agent, or Firm* — Ashurst Perkins Coie US LLP

(57) ABSTRACT

A controller for a switching converter with a power switch includes a gate driver, a first transistor, and a regulator. The gate driver and provides a drive voltage to control the power switch based on a switch control signal. The first transistor is coupled between a first power supply node and a power supply terminal of the gate driver. A current sense signal representative of a current flowing through the power switch is provided to a floating node in response to the switch control signal being a first level, and the floating node is coupled to a reference ground in response to the switch control signal being a second level. A gate voltage of the first transistor is adjusted by the regulator coupled to the floating node based on a float reference voltage and a feedback voltage provided by a feedback stage.

20 Claims, 4 Drawing Sheets

SWITCHING CONVERTER WITH FLOATING NODE AND ASSOCIATED CONTROL CIRCUIT

CROSS-REFERENCE TO RELATED APPLICATIONS

This application claims the benefit of CN application No. 202311567561.5, filed on Nov. 22, 2023, and incorporated herein by reference.

TECHNICAL FIELD

The present invention generally relates to electronic circuits, and more particularly but not exclusively, to controllers for a switching converter with a floating node and associated control circuits and integrated control circuits.

BACKGROUND

In automotive, consumer and industrial applications, most of the functions performed by electrical devices, such as power conversion and motor driving, rely on controllable power switches. Examples of the controllable power switches include insulated-gate bipolar transistors (IGBTs), metal-oxide-semiconductor field-effect transistors (MOSFETs), gallium nitride (GaN), silicon carbide (SiC) and so on. These controlled switches have been used in a variety of applications, but not limited to power supplies and switching converters.

SUMMARY

An embodiment of the present invention discloses a controller for a switching converter with a power switch. The controller has a gate driver, a first transistor, a high-side switch, a low-side switch, and a regulator. The gate driver receives a switch control signal and provides a drive voltage to a control terminal of the power switch based on the switch control signal. The first transistor has a first terminal coupled to a first power supply node and a second terminal coupled to a power supply terminal of the gate driver. The high-side switch provides a current sense signal representative of a current flowing through the power switch to a floating node in response to the switch control signal being a first level. The low-side switch couples the floating node to a reference ground in response to the switch control signal being a second level. The regulator has a reference terminal coupled to the floating node and an output terminal coupled to a gate terminal of the first transistor. A gate voltage of the first transistor is adjusted by the regulator based on a float reference voltage and a feedback voltage provided by a feedback stage.

Another embodiment of the present invention discloses a switching converter. The switching converter has a power switch, a first transistor, a high-side switch, a low-side switch and a regulator. The gate driver receives a switch control signal and provides a drive voltage to a control terminal of the power switch based on the switch control signal. The first transistor has a first terminal coupled to a first power supply node and a second terminal coupled to a power supply terminal of the gate driver. The high-side switch provides a current sense signal representative of a current flowing through the power switch to a floating node in response to the switch control signal being a first level. The low-side switch couples the floating node to a reference ground in response to the switch control signal being a second level. The regulator has a reference terminal coupled to the floating node and an output terminal coupled to a gate terminal of the first transistor. A gate voltage of the first transistor is adjusted by the regulator based on a float reference voltage and a feedback voltage provided by a feedback stage.

Yet another embodiment of the present invention discloses an integrated control circuit for a switching converter with a power switch. The integrated control circuit has a first pin, a second pin, a third pin, a fourth pin, a gate driver, a first transistor, a high-side switch, a low-side switch and a regulator. The first pin is configured to receive a first power supply voltage. The second pin is coupled to a control terminal of the power switch. The third pin is configured to receive a current sense signal representative of a current flowing through the power switch. The fourth pin is coupled to a reference ground. The gate driver is configured to receive a switch control signal and to provide a drive voltage to the second pin based on the switch control signal. The first transistor has a first terminal coupled to the first pin and a second terminal coupled to a power supply terminal of the gate driver. The high-side switch is coupled between the third pin and a floating node. The high-side switch is configured to provide the current sense signal to the floating node in response to the switch control signal being a first level. The low-side switch is coupled between the floating node and the fourth pin. The low-side switch is configured to couple the floating node to the reference ground in response to the switch control signal being a second level. The regulator has a reference terminal coupled to the floating node and an output terminal coupled to a gate terminal of the first transistor. A gate voltage of the first transistor is adjusted by the regulator based on a float reference voltage and a feedback voltage provided by a feedback stage.

BRIEF DESCRIPTION OF DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
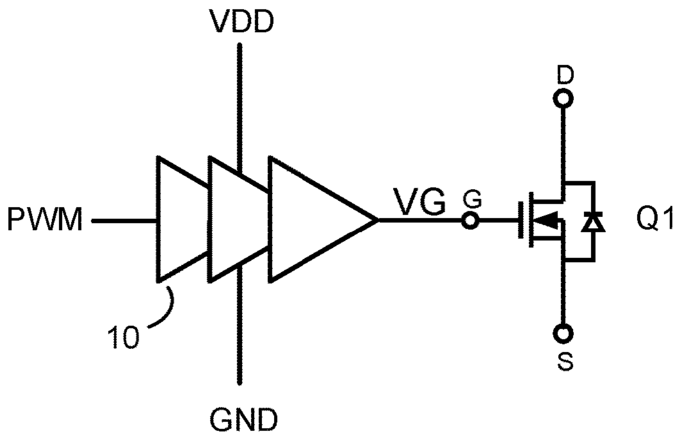
FIG. 1 (Prior art)
FIG. 1 shows a schematic circuit diagram of a gate driving circuit 10 for driving a controlled power switch device.

FIG. 1 shows a schematic circuit diagram of a gate driving circuit 10 for driving a controlled power switch device. Generally, the gate driving circuit 10 is required to control the turning-on and turning-off of the controllable power switch device Q1. As shown in FIG. 1, the gate driving circuit 10 receives a switch control signal PWM and generates a drive voltage VG according to the switch control signal PWM to drive the power switch device Q1. For example, when the switch control signal PWM becomes logic high, the driving voltage VG controls the power switch device Q1 to be turned on, and when the switch control signal PWM becomes logic low, the driving voltage VG controls the power switch device Q1 to be turned off. However, a gate-source voltage VGS of the power switch device Q1 often varies with applications. When the gate-source voltage VGS is too low, an internal on-resistance of the power switch device Q1 will be increased and the performance of the power switch device Q1 will be affected and degraded. An excessive gate-source voltage VGS will cause electrical overstress (EOS) and reliability problems.

In the following detailed description, for the sake of brevity, only a flyback converter is taken as an example to explain and describe the working principle of the present invention. However, those skilled in the art should know that any switching converter with a power switch also can be used in the embodiment of the present invention.

Figure 2:
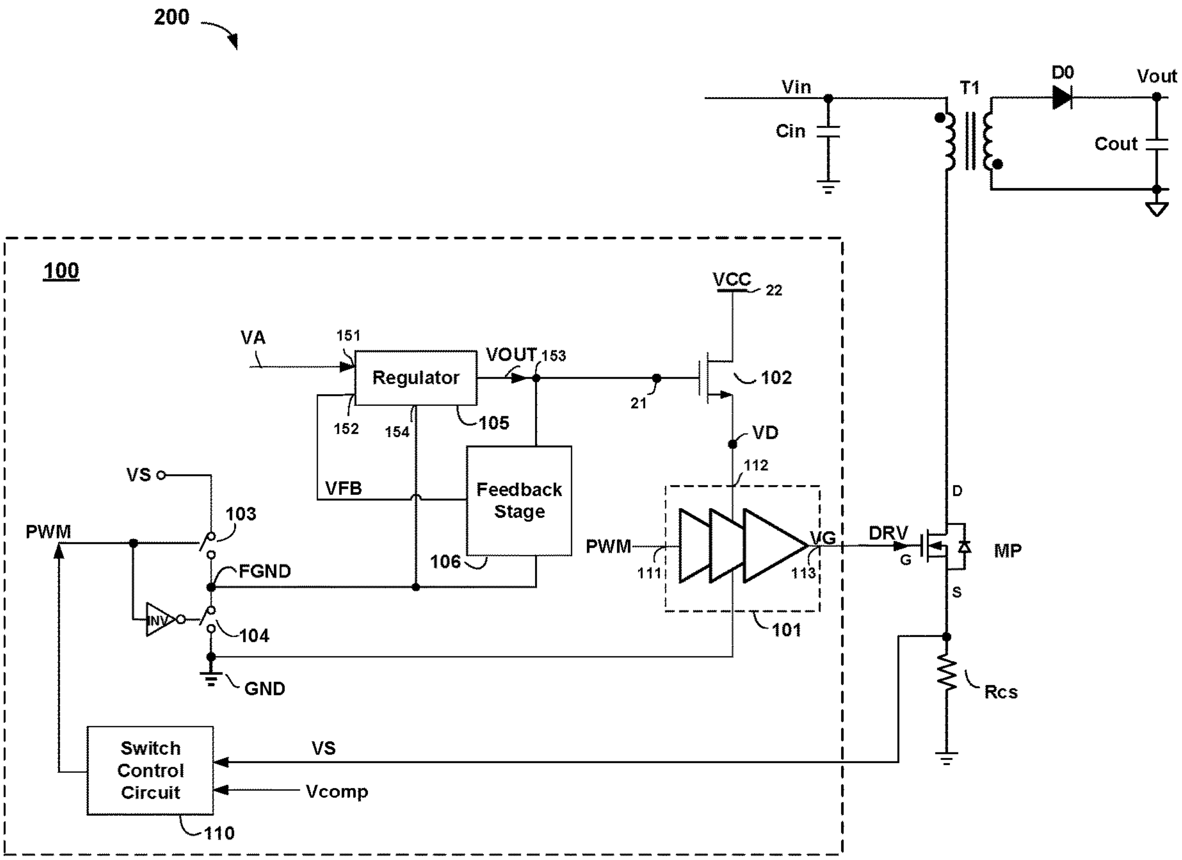
FIG. 2 shows a block circuit diagram of a switching converter 200 in accordance with an embodiment of the present invention.

FIG. 2 shows a block circuit diagram of a switching converter 200 in accordance with an embodiment of the present invention. As shown in FIG. 2, the switching converter 200 comprises a transformer T1, a power switch MP, a secondary switch DO, an input capacitor Cin, an output capacitor Cout and a controller 100. The transformer T1 has a primary winding and a secondary winding. The primary winding and the secondary winding both have a first terminal and a second terminal. The first terminal of the primary winding receives an input voltage Vin, and the second terminal of the secondary winding is coupled to a secondary reference ground. The power switch MP is coupled between the second terminal of the primary winding and a primary reference ground GND. The controller 100 is configured to control the turning-on and turning-off of the power switch MP, the energy is alternatively stored in the primary winding or is transferred to the secondary winding. The secondary winding transfers the energy to the output capacitor Cout and provides a DC output voltage Vout across the output capacitor Cout for a power conversion.

In the embodiment shown in FIG. 2, the power switch MP has a control terminal G, a first terminal D and a second terminal S. In one embodiment, the power switch MP may be any controllable semiconductor devices, such as a MOSFET (Metal Oxide Semiconductor Field Effect Transistor), a SiC (Silicon Carbide), a GaN (Gallium Nitride) and so on.

For the sake of brevity, the term "gate" is used herein to refer to the control terminal of the power switch MP (e.g., a gate of a MOSFET, a gate of a SiC, a gate of a GaN and/or the like). Based on a driving control signal DRV applied to the control terminal of the power switch MP, an electrical connection between the first terminal D of the power switch MP and the second terminal S of the power switch MP is controlled.

As shown in FIG. 2, the controller 100 comprises a gate driver 101, a first transistor 102, a high-side switch 103, a low-side switch 104, a regulator 105, a feedback stage 106 and a switch control circuit 110. In the embodiment shown in FIG. 2, the switch control circuit 110 receives a current sense signal VS representative of a current flowing through the power switch MP, and receives a compensation signal COMP related to the output voltage Vout, and provides a switch control signal PWM at an output terminal. The switch control signal PWM may comprises a pulse width modulation signal. In one embodiment, the switch control circuit 110 is coupled to a current sense resistor Rcs coupled in series with the power switch MP, to get the current sense signal VS by sensing the current flowing through the power switch MP.

The gate driver 101 has an input terminal 111, a power supply terminal 112, an output terminal 113 and a reference terminal. The reference terminal of the gate driver 101 is coupled to the primary reference ground GND. The input terminal 111 of the gate driver 101 receives the switch control signal PWM. The output terminal 113 of the gate driver 101 is coupled to the control terminal G of the power switch MP for providing the driving control signal DRV. Based on the switch control signal PWM, the gate driver 101 provides a drive voltage VG at the output terminal 113 to control the turning-on and turning-off of the power switch MP. In response to the switch control signal PWM being a first level (e.g., logic high), the gate driver 101 turns on the power switch MP. In response to the switch control signal PWM being a second level (e.g., logic low), the gate driver 102 turns off the power switch MP. The drive voltage VG has a maximum value related to a voltage VD received at the power supply terminal 112 of the gate driver 101. In one embodiment, the maximum value of the drive voltage VG equals to the voltage VD at the power supply terminal 112 of the gate driver 101. In another embodiment, the maximum value of the drive voltage VG equals to a voltage difference between the voltage VD and a voltage threshold. In one embodiment, the power switch MP is rendered non-conductive when a gate-source voltage drops to or below the voltage threshold. The power switch MP is rendered conductive to supply a charging current when the gate-source voltage rises to the voltage threshold.

The first transistor 102 has a first terminal, a second terminal and a control terminal, wherein the first terminal is coupled to a power supply node 22 to receive a first power supply voltage VCC, the second terminal is coupled to the power supply terminal 112 of the gate driver 101. In the embodiment shown in FIG. 2, the first transistor 102 has a drain terminal, a source terminal and a gate terminal. The drain terminal of the first transistor 102 is coupled to the power supply node 22, the source terminal of the first transistor 102 is coupled to the power supply terminal 112, the gate terminal of the first transistor 101 is coupled to an output terminal 153 of the regulator 105. The first transistor 102 is configured to provide the charging current flowing from the power supply node 22 to the power supply terminal 112 based on the voltage at the control terminal of the first transistor 102 and to provide the voltage VD.

As shown in FIG. 2, the high-side switch 103 has a first terminal, a second terminal and a control terminal. The first terminal of the high-side switch 103 receives the current sense signal VS. The second terminal of the high-side switch 103 is coupled to a floating node FGND. The control terminal of the high-side switch 103 is coupled to the output terminal of the switch control circuit 110 to receive the switch control signal PWM. In response to the switch control signal PWM being the first level, the high-side switch 103 is turned on and thus the current sense signal VS is provided to the floating node FGND. The low-side switch 104 has a first terminal, a second terminal and a control terminal, wherein the first terminal is coupled to the floating node FGND, the second terminal is coupled to the primary reference ground GND, the control terminal is configured to receive the switch control signal PWM through an inverter circuit INV. In response to the switch control signal PWM being the second level, the low-side switch 104 is turned on, and the floating node FGND is coupled to the primary reference ground GND.

The regulator 105 has a first input terminal 151, a second input terminal 152, the output terminal 153 and a reference terminal 154. The first input terminal 151 receives a float reference voltage VA. The float reference voltage VA is generated by superimposing a voltage VFGND at the floating node FGND on a reference voltage VREF. The second input terminal 152 is coupled to a feedback stage 106 that provides a feedback voltage VFB. The reference terminal 154 is coupled to the floating node FGND, the output terminal 153 is coupled to the feedback stage 106 and the control terminal of the first transistor 102. The regulator 105 is configured to adjust the voltage at the control terminal of the first transistor 102 (e.g., a gate voltage of the first transistor 102) based on the float reference voltage VA and the feedback voltage VFB.

The feedback stage 106 is coupled between the output terminal 153 of the regulator 105 and the floating node FGND, and has an output terminal to provide the feedback voltage VFB. In one embodiment, the feedback stage 106 comprises a voltage divider with resistors. In another embodiment, the feedback stage 106 comprises other voltage divider, e.g., capacitor voltage divider.

In one embodiment, the controller 100 sets the floating node FGND based on the switch control signal PWM, and the sum signal VA of the voltage VFGND at the floating node FGND and the reference voltage VREF is configured as an adaptive reference, the voltage at the control terminal of the first transistor 102 is thus adjusted adaptively, and the voltage VD at the power supply terminal 112 of the gate driver 101 is accordingly adjusted, and finally the drive voltage VG provided at the output terminal of the gate driver 101 is adjusted. In this way, although the current flowing through the power switch MP changes dynamically with a load current, the voltage between the control terminal G and the second terminal S of the power switch MP is high enough, so that the on-resistance of the power switch MP can be minimized and not exceed the reliability limit allowed by the power switch MP.

Figure 3:
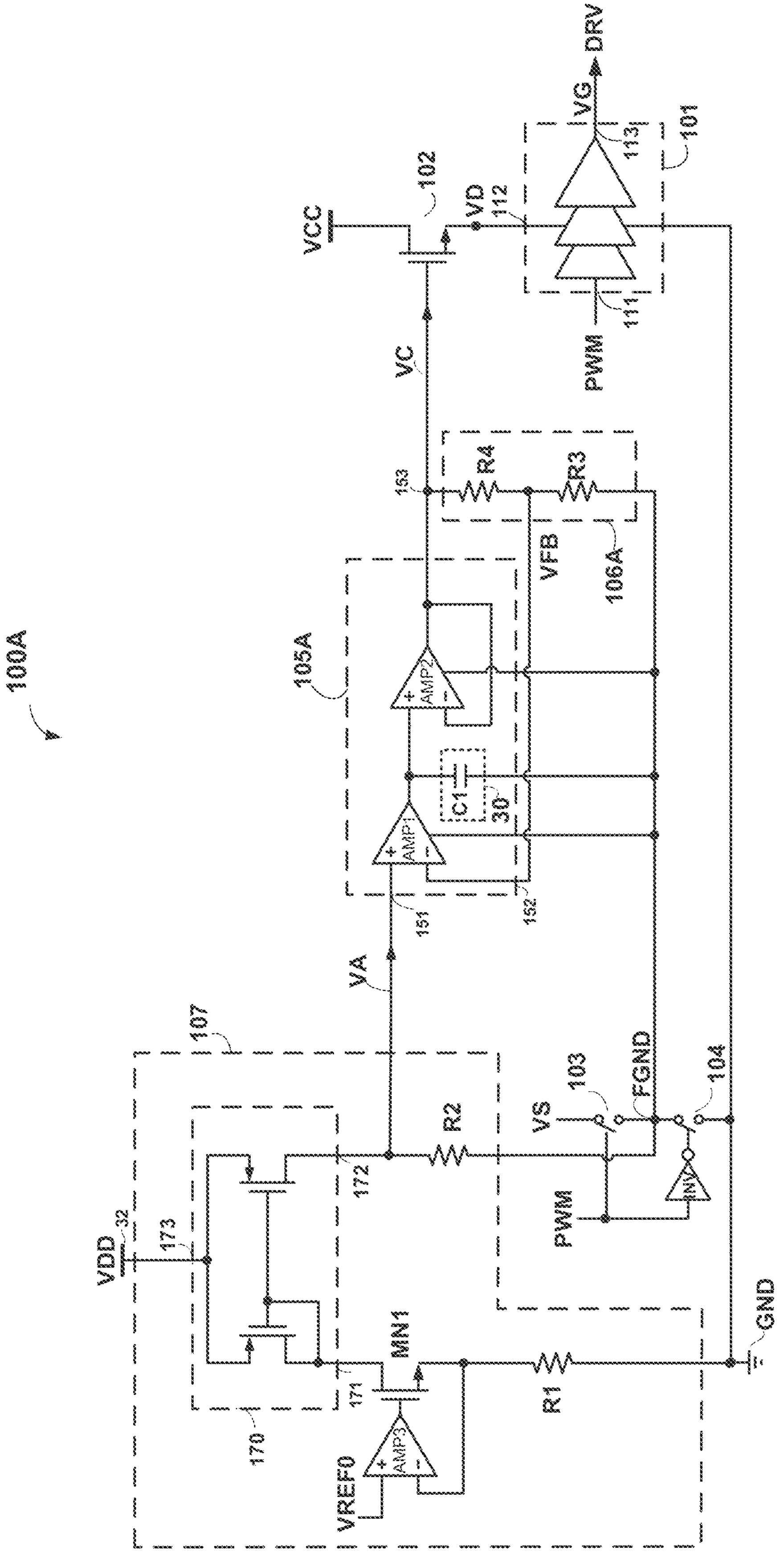
FIG. 3 shows a schematic diagram of a controller 100A in accordance with an embodiment of the present invention.

FIG. 3 shows a schematic diagram of a controller 100A in accordance with an embodiment of the present invention. As shown in FIG. 3, the regulator 105A comprises a first operational amplifier AMP1, a second operational amplifier AMP2 and a compensation circuit 30.

The first operational amplifier AMP1 has a first input terminal, a second input terminal and an output terminal. The first input terminal of the first operational amplifier AMP1 receives the float reference voltage VA. The second input terminal of the first operational amplifier AMP1 is coupled to the output terminal of the feedback stage 106A to receive the feedback voltage VFB. In one embodiment, the first input terminal of the first operational amplifier AMP1 is a non-inverting terminal, and the second input terminal of the first operational amplifier AMP1 is an inverting terminal.

The second operational amplifier AMP2 has a first input terminal, a second input terminal and an output terminal. The first input terminal of the second operational amplifier AMP2 is coupled to the output terminal of the first operational amplifier AMP1. The second input terminal of the second operational amplifier AMP2 is coupled to the output terminal of the second operational amplifier AMP2. The output terminal of the second operational amplifier AMP2 is coupled to the output terminal 153 of the regulator 105A. In one embodiment, the first input terminal of the second operational amplifier AMP2 is a non-inverting terminal, and the second input terminal of the second operational amplifier AMP2 is an inverting terminal. In addition, the first operational amplifier AMP1 and the second operational amplifier AMP2 both have a reference terminal coupled to the floating node FGND.

The compensation circuit 30 is coupled between the first input terminal of the second operational amplifier AMP2 and the floating node FGND, to make sure the feedback loop stability. In the embodiment show in FIG. 3, the compensation circuit 30 comprises a compensation capacitor C1, to push a pole of the feedback system to a lower frequency, and thus improve the system stability.

The feedback stage 106A is coupled between the output terminal 153 of the regulator 105A and the floating node FGND. The feedback stage 106A provides the feedback voltage VFB at the output terminal. In the embodiment shown in FIG. 3, the feedback stage 106A comprises a voltage divider consists of resistors R3 and R4.

In the embodiment shown in FIG. 3, the controller 100A further comprises a float reference voltage generator 107. The float reference voltage generator 107 comprises a third operational amplifier AMP3, a current mirror 170 and a third transistor MN1.

The third operational amplifier AMP3 has a first input terminal, a second input terminal and an output terminal. The first input terminal of the third operational amplifier AMP3 receives a base reference voltage VREF0. The second input terminal of the third operational amplifier AMP3 is coupled to the primary reference ground GND through a resistor R1. In one embodiment, the first input terminal of the third operational amplifier AMP3 is a non-inverting terminal, and the second input terminal of the third operational amplifier AMP3 is an inverting terminal. The current mirror 170 has a setting terminal 171, an output terminal 172 and a power supply terminal 173. The power supply terminal 173 is coupled to a second power supply node 32 to receive a second power supply voltage VDD. The second power supply voltage VDD is generated by stepping down the first power supply voltage VCC. In one embodiment, the second power supply voltage VDD is 5V, and the first power supply voltage VCC changes between 9V and 30V. The output terminal 172 is coupled to the floating node FGND through a resistor R2. The third transistor MN1 is coupled between the setting terminal 171 of the current mirror 170 and the second input terminal of the third operational amplifier AMP3. A control terminal of the third transistor MN1 is coupled to the output terminal of the third operational amplifier AMP3.

As shown in FIG. 3, the output terminal 172 of the current mirror 170 is further coupled to the first input terminal 151 of the regulator 105A, to provide the float reference voltage VA. In the embodiment shown in FIG. 3, the float reference voltage VA provided by the float reference voltage generator 107 can be expressed as VA=VREF+VFGND=VREF0*(R2/R1)+VFGND. Where VFGND is the voltage at the float node FGND, VREF is the reference voltage, VREF0 is the base reference voltage. Accordingly, the voltage VC at the output terminal 153 of the regulator 153A is expressed: VC=VREF*(1+R4/R3)+VFGND.

In some applications, a threshold voltage of the first transistor 102 is sensitive to temperature change and thus is temperature dependency. For example, when the temperature increases, the threshold voltage of the first transistor 102 decreases. The power supply terminal 112 of the gate driver 101 is coupled to the source terminal of the first transistor 102, the voltage change of the voltage VD at the power supply terminal 112 is also magnified due to the temperature dependency of the threshold voltage of the first transistor 102.

Figure 4:
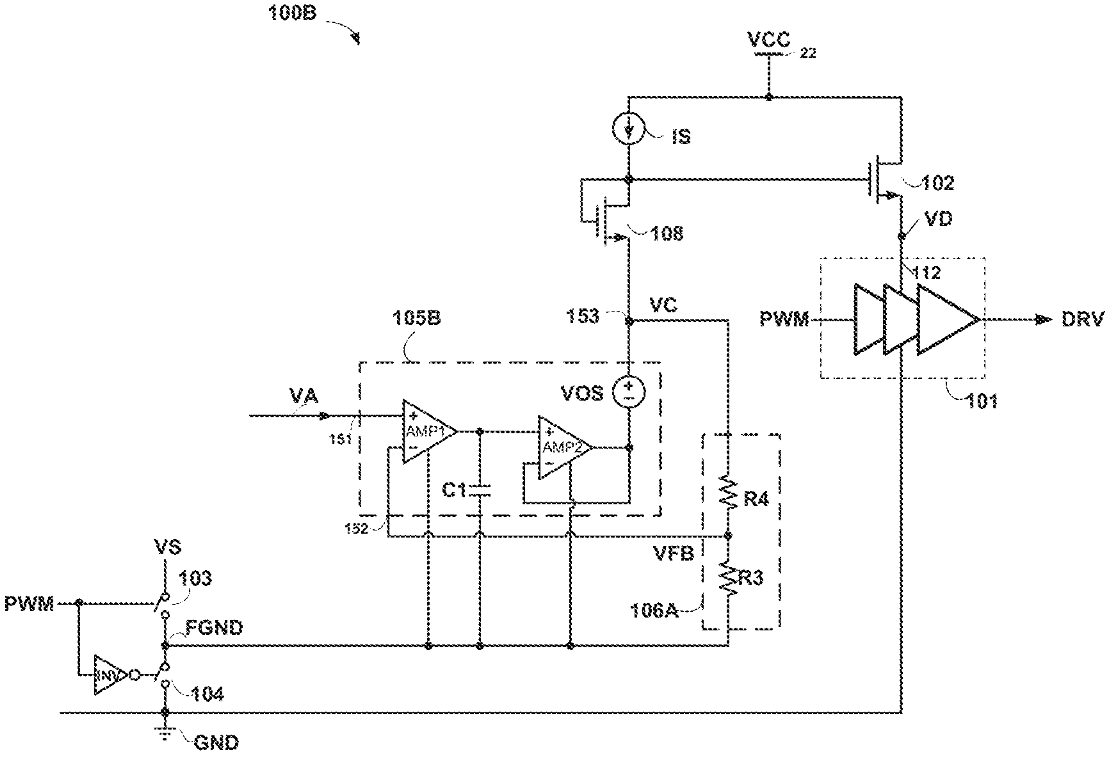
FIG. 4 shows a schematic diagram of a controller 100B in accordance with an embodiment of the present invention.

To solve this problem, compared with the controller 100 shown in FIG. 2, the controller 100B shown in FIG. 4 further comprises a current source IS and a second transistor 108.

FIG. 4 shows a schematic diagram of a controller 100B in accordance with an embodiment of the present invention. As shown in FIG. 4, the current source IS has a power supply terminal and an output terminal, wherein the power supply terminal is coupled to the power supply node 22, the output terminal is coupled to the control terminal of the first transistor 102. The second transistor 108 has a source terminal, a drain terminal and a gate terminal. The source terminal of the second transistor 108 is coupled to the output terminal 153 of the regulator 105B. The drain terminal and the gate terminal of the second transistor 108 are both coupled to the control terminal of the first transistor 102. In response to a voltage change of the voltage VC at the output terminal 153 of the regulator 105B, the gate voltage of the second transistor 108 and the gate voltage of the first transistor 102 can be adjusted. In detail, as shown in FIG. 4, the voltage VD at the power supply terminal 112 of the gate driver 101 can be expressed as VD=VC+VGS2−VGS1. Where VGS1 is a gate-source voltage of the first transistor 102. VGS2 is a gate-source voltage of the second transistor 108.

It can be seen that the voltage VD at the power supply terminal 112 contains a difference between the two gate-source voltages of VGS1 and VGS2, and thus the temperature dependency is cancelled, and the voltage VD at the power supply terminal VD is no longer affected by the temperature dependency, and the voltage VD attains a substantially constant level.

Furthermore, the regulator 105B shown in FIG. 4 comprises a level shift circuit VOS. The level shift circuit VOS has a positive terminal and a negative terminal. The positive terminal of the level shift circuit VOS is coupled to the source terminal of the second transistor 108 and the output terminal 153 of the regulator 105B. The negative terminal of the level shift circuit VOS is coupled to the output terminal of the second operational amplifier AMP2. The level shift circuit VOS is configured to limit the operational voltage of the regulator 105B not exceed the operational range allowed by the first operational amplifier AMP1 and the second operational amplifier AMP2.

Figure 5:
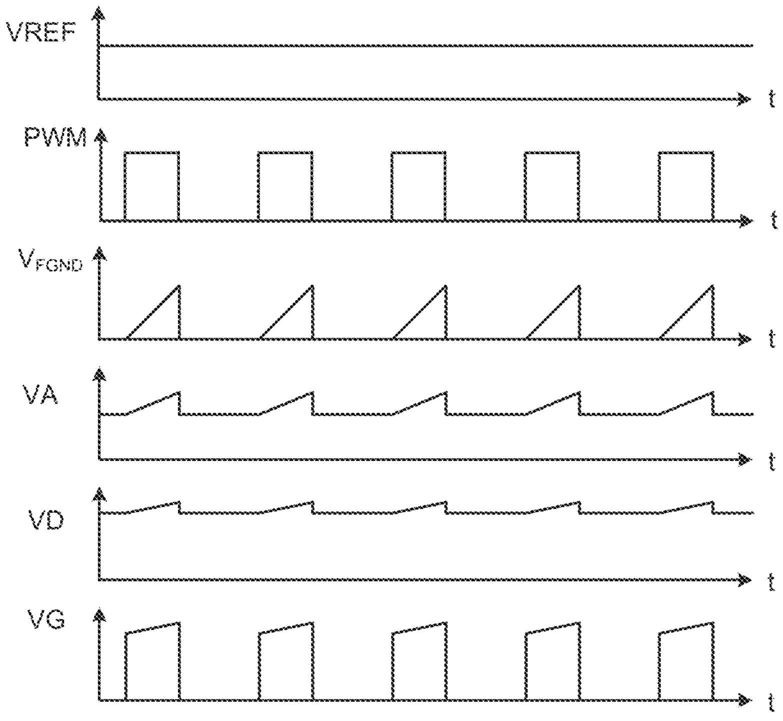
FIG. 5 shows working waveforms of a switching converter in accordance with an embodiment of the present invention.

FIG. 5 shows working waveforms of a switching converter in accordance with an embodiment of the present invention. As shown in FIG. 5, the reference voltage VREF is a fixed level. In response to the switch control signal PWM being the first level, the high-side switch 103 is turned on, the voltage VFGND at the floating node FGND increases from 0 when a current flowing through the power switch MP increases. And The float reference VA also increases since it is a sum signal of the reference signal VREF and the voltage VFGND. Accordingly, the voltage VD at the power supply terminal 112 of the gate driver 101 and the drive voltage VG at the output terminal 113 of the gate driver 101 both increases from a default value for turning-on the power switch MP.

In response to the switch control signal PWM being the second level, the low-side switch 104 is turned on. The voltage VFDND at the floating node FGND is coupled to the primary reference ground GND and resets to 0. The voltage VD at the power supply terminal 112 of the gate driver 101 starts to return the default value at the time of the reset of the voltage VFGND, the drive voltage VG provided at the output terminal 113 of the gate driver 101 decreases to logic low, to turn off the power switch MP.

Figure 6:
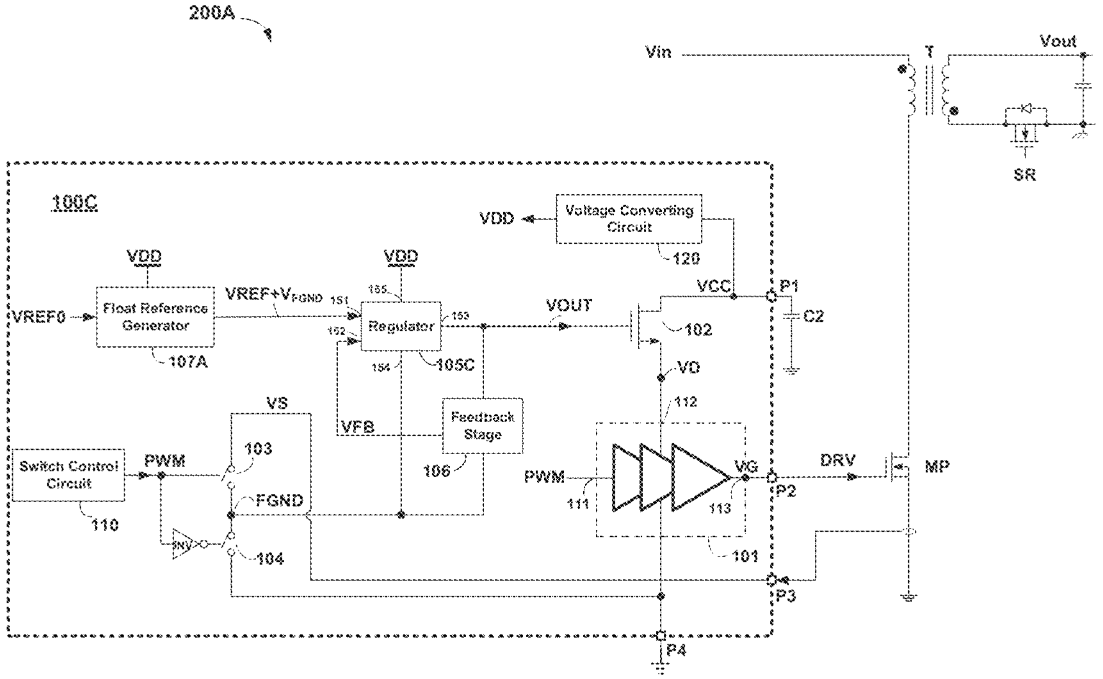
FIG. 6 shows a schematic diagram of a switching converter 200A in accordance with an embodiment of the present invention.

FIG. 6 shows a schematic diagram of a switching converter 200A in accordance with an embodiment of the present invention. As shown in FIG. 6, the switching converter 200A comprises a transformer T, a power switch MP, a secondary switch SR and an integrated control circuit 100C. The transformer T has a primary winding and a secondary winding. The primary winding and the secondary winding both have a first terminal and a second terminal. The first terminal of the primary winding receives an input voltage Vin, the first terminal of the secondary winding provides a DC output voltage Vout. The second terminal of the secondary winding is coupled to a secondary reference ground. The power switch MP is coupled between the second terminal of the primary winding and a primary reference ground GND. The secondary switch SR is coupled between the second terminal of the secondary winding and the secondary reference ground.

Compared with the controller 100, the integrated control circuit 100C shown in FIG. 6 comprises a voltage converting circuit 120 and a plurality of pins, in addition to the gate driver 101, the first transistor 102, the high-side switch 103, the low-side switch 104, the regulator 105C, the feedback stage 106, the float reference voltage generator 107A and the switch control circuit 110 shown in FIG. 2. The plurality of pins comprises a power supply pin P1, a control pin P2, a current sense pin P3 and a reference ground pin P4 coupled to the primary reference ground GND.

As shown in FIG. 6, the power supply pin P1 is coupled to a power supply circuit (not shown) of the switching converter 200A and a power supply capacitor C2, to receive the first power supply voltage VCC for powering the integrated control circuit 100C. In one embodiment, the first power supply voltage VCC can change between 9V and 30V. The first transistor 102 is coupled between the power supply pin P1 and the power supply terminal 112 of the gate driver 101. The voltage converting circuit 120 has an input terminal and an output terminal, wherein the input terminal is configured to receive the first power supply voltage VCC.

The voltage converting circuit 120 converts the first power supply voltage VCC to a second power supply voltage VDD that is less than the first power supply voltage VCC. The second power supply voltage VDD is configured to provide power to the logic circuit parts located inside of the integrated control circuit 100C. In one embodiment, the second power supply voltage VDD is about 5V. In one embodiment, the second power supply voltage VDD is applied to the power supply terminal of the float reference voltage generator 107A and the power supply terminal 155 of the regulator 105C, to provide the power supply. In one embodiment, the voltage converting circuit 120 comprises a buck converter. In another embodiment, the voltage converting circuit 120 comprises a low dropout regulator (LDO).

The output terminal 113 of gate driver 101 is configured to provide a drive voltage VG to control the power switch MP based on the switch control signal PWM.

In one embodiment, the current sense pin P3 is coupled to a current sense resistor Rcs coupled in series with the power switch MP, to sense the current flowing through the power switch MP, and to provide the current sense signal VS. The switch control circuit 110 has a first input terminal, a second input terminal and an output terminal, wherein the first input terminal is coupled to the current sense pin P3 to receive the current sense signal VS, the second input terminal receives a signal related to the output signal of the switching converter 200A, and the output terminal provides the switch control signal PWM.

The gate driver 101 is configured to provide the drive voltage VG at the control pin P2 to control the turning-on and the turning-off of the power switch in response to a logic level of the switch control signal PWM. In detail, in response to the switch control signal PWM being the first level, the high-side switch 103 is turned on and the current sense signal VS representative of the current flowing through the power switch MP is provided to the floating node FGND. In response to the switch control signal PWM being the second level, the low-side switch 104 is turned on to couple the floating node FGND to the primary reference ground GND. The regulator 105C is configured to adjust the gate voltage of the first transistor 102 based on the float reference voltage VA (i.e., VREF+VFGND) and the feedback voltage VFB, to finally control the voltage VD at the power supply terminal 112 of the gate driver 101 and the drive voltage VG at the output terminal 113 of the gate driver 101 to change with the current flowing through the power switch MP. As a result, the voltage between the control terminal and the second terminal S of the power switch MP is controlled to be high enough to minimize the on-resistance of the power switch MP, at the same time, it is also low enough and not exceed the reliability limitation allowed by the power switch MP.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated, and they obviously will be resorted to by those skilled in the art without departing from the spirit and the scope of the invention as hereinafter defined by the appended claims as only a preferred embodiment(s) thereof has been disclosed.

What is claimed is:

1. A controller for a switching converter with a power switch, comprising:
- a gate driver configured to receive a switch control signal and to provide a drive voltage to a control terminal of the power switch based on the switch control signal;
- a first transistor having a first terminal coupled to a first power supply node and a second terminal coupled to a power supply terminal of the gate driver;
- a high-side switch configured to provide a current sense signal representative of a current flowing through the power switch to a floating node in response to the switch control signal being a first level;
- a low-side switch configured to couple the floating node to a reference ground in response to the switch control signal being a second level; and
- a regulator having a reference terminal coupled to the floating node and an output terminal coupled to a gate terminal of the first transistor, wherein a gate voltage of the first transistor is adjusted by the regulator based on a float reference voltage and a feedback voltage provided by a feedback stage.

2. The controller of claim 1, wherein:
- the float reference voltage is generated by superimposing a voltage at the floating node on a reference voltage; and wherein
- the feedback stage is coupled between the output terminal of the regulator and the floating node.

3. The controller of claim 2, wherein the regulator comprises:
- a first operational amplifier having a first input terminal to receive the float reference voltage, and a second input terminal to receive the feedback voltage;
- a second operational amplifier having a first input terminal coupled to an output terminal of the first operational amplifier, and a second input terminal coupled to an output terminal of the second operational amplifier; and
- a compensation circuit coupled between the first input terminal of the second operational amplifier and the floating node.

4. The controller of claim 3, wherein the compensation circuit comprises a compensation capacitor.

5. The controller of claim 3, further comprising:
- a current source having a power supply terminal coupled to the first power supply node and an output terminal coupled to the gate terminal of the first transistor, and the first transistor has a first gate-source voltage between the gate terminal and the second terminal of the first transistor;
- a second transistor having a source terminal, a drain terminal and a gate terminal, wherein the drain terminal and the gate terminal of the second transistor are coupled to the gate terminal of the first transistor, and the second transistor has a second gate-source voltage higher than the first gate-source voltage; and wherein
- the output terminal of the regulator is coupled to the source terminal of the second transistor.

6. The controller of claim 3, wherein the regulator further comprises:

a level shift circuit having a positive terminal coupled to the output terminal of the regulator and a negative terminal coupled to the output terminal of the second operational amplifier.

7. The controller of claim 2, further comprising:

a third operational amplifier having a first input terminal, a second input terminal and an output terminal, wherein the first input terminal is configured to receive a base reference voltage, the second input terminal is coupled to the reference ground through a first resistor;

a current mirror having a power supply terminal, a setting terminal and an output terminal, wherein the power supply terminal is coupled to a second power supply node, the output terminal is coupled to the floating node through a second resistor; and a third transistor coupled between the setting terminal of the current mirror and the second input terminal of the third operational amplifier, and a control terminal of the third transistor is coupled to the output terminal of the third operational amplifier.

8. The controller of claim 7, wherein a voltage of the second power supply node is less than that of the first power supply node.

9. A switching converter, comprising:

a power switch;

a gate driver configured to receive a switch control signal and to provide a drive voltage to a control terminal of the power switch based on the switch control signal;

a first transistor having a first terminal coupled to a first power supply node and a second terminal coupled to a power supply terminal of the gate driver;

a high-side switch configured to provide a current sense signal representative of a current flowing through the power switch to a floating node in response to the switch control signal being a first level;

a low-side switch configured to couple the floating node to a reference ground in response to the switch control signal being a second level; and a regulator having a reference terminal coupled to the floating node and an output terminal coupled to a gate terminal of the first transistor, wherein a gate voltage of the first transistor is adjusted by the regulator based on a float reference voltage and a feedback voltage provided by a feedback stage.

10. The switching converter of claim 9, wherein:

the float reference voltage is generated by superimposing a voltage at the floating node on a reference voltage; and wherein the feedback stage is coupled between the output terminal of the regulator and the floating node.

11. The switching converter of claim 10, wherein the regulator comprising:

a first operational amplifier having a first input terminal to receive the float reference voltage, and a second input terminal to receive the feedback voltage;

a second operational amplifier having a first input terminal coupled to an output terminal of the first operational amplifier, and a second input terminal coupled to an output terminal of the second operational amplifier; and a compensation circuit coupled between the first input terminal of the second operational amplifier and the floating node.

12. The switching converter of claim 11, further comprising:

a current source having a power supply terminal coupled to the first power supply node and an output terminal coupled to the gate terminal of the first transistor, and the first transistor has a first gate-source voltage between the gate terminal and the second terminal of the first transistor;

a second transistor having a source terminal, a drain terminal and a gate terminal, wherein the drain terminal and the gate terminal of the second transistor are coupled to the gate terminal of the first transistor, and the second transistor has a second gate-source voltage higher than the first gate-source voltage; and wherein the output terminal of the regulator is coupled to the source terminal of the second transistor.

13. The switching converter of claim 12, further comprising:

a level shift circuit having a positive terminal coupled to the output terminal of the regulator and a negative terminal coupled to the output terminal of the second operational amplifier.

14. The switching converter of claim 10, further comprising:

a third operational amplifier having a first input terminal, a second input terminal and an output terminal, wherein the first input terminal is configured to receive a base reference voltage, the second input terminal is coupled to the reference ground through a first resistor;

a current mirror having a power supply terminal, a setting terminal and an output terminal, wherein the power supply terminal is coupled to a second power supply node, the output terminal is coupled to the floating node through a second resistor; and a third transistor coupled between the setting terminal of the current mirror and the second input terminal of the third operational amplifier, and a control terminal of the third transistor is coupled to the output terminal of the third operational amplifier.

15. The switching converter of claim 14, wherein a voltage of the second power supply node is less than that of the first power supply node.

16. An integrated control circuit for a switching converter with a power switch, comprising:

a first pin configured to receive a first power supply voltage;

a second pin configure to be coupled to a control terminal of the power switch;

a third pin configured to receive a current sense signal representative of a current flowing through the power switch;

a fourth pin configure to be coupled to a reference ground;

a gate driver configured to receive a switch control signal and to provide a drive voltage to the second pin based on the switch control signal;

a first transistor having a first terminal coupled to the first pin and a second terminal coupled to a power supply terminal of the gate driver;

a high-side switch coupled between the third pin and a floating node and configured to provide the current sense signal to the floating node in response to the switch control signal being a first level;

a low-side switch coupled between the floating node and the fourth pin, and configured to couple the floating node to the reference ground in response to the switch control signal being a second level; and a regulator having a reference terminal coupled to the floating node and an output terminal coupled to a gate terminal of the first transistor, wherein a gate voltage of the first transistor is adjusted by the regulator based on a float reference voltage and a feedback voltage provided by a feedback stage.

17. The integrated control circuit of claim 16, wherein the float reference voltage is generated by superimposing a voltage at the floating node on a reference voltage; and wherein the feedback stage is coupled between the output terminal of the regulator and the floating node.

18. The integrated control circuit of claim 17, wherein the regulator comprising:

a first operational amplifier having a first input terminal to receive the float reference voltage, and a second input terminal to receive the feedback voltage;

a second operational amplifier having a first input terminal coupled to an output terminal of the first operational amplifier, and a second input terminal coupled to an output terminal of the second operational amplifier; and a compensation circuit coupled between the first input terminal of the second operational amplifier and the floating node.

19. The integrated control circuit of claim 18, further comprising:

a current source having a power supply terminal coupled to receive the first power supply voltage and an output terminal coupled to the gate terminal of the first transistor, and the first transistor has a first gate-source voltage between the gate terminal and the second terminal of the first transistor;

a second transistor having a source terminal, a drain terminal and a gate terminal, wherein the drain terminal and the gate terminal of the second transistor are coupled to the gate terminal of the first transistor, and the second transistor has a second gate-source voltage higher than the first gate-source voltage; and wherein the output terminal of the regulator is coupled to the source terminal of the second transistor.

20. The integrated control circuit of claim 17, further comprising:

a third operational amplifier having a first input terminal, a second input terminal and an output terminal, wherein the first input terminal is configured to receive a base reference voltage, the second input terminal is coupled to the reference ground through a first resistor;

a current mirror having a power supply terminal, a setting terminal and an output terminal, wherein the power supply terminal is coupled to receive a second power supply voltage, the output terminal is coupled to the floating node through a second resistor; and a third transistor coupled between the setting terminal of the current mirror and the second input terminal of the third operational amplifier, and a control terminal of the third transistor is coupled to the output terminal of the third operational amplifier.

* * * * *